United States Patent
Jie (10) Patent No.: US 12,012,300 B2
(45) Date of Patent: Jun. 18, 2024

(54) SELECTIVELY DEPLOYABLE CABLE MANAGEMENT DEVICE

(71) Applicant: Lumi Legend Electrical Co. LTD, Ningbo (CN)

(72) Inventor: Xu Jie, Ningbo (CN)

(*) Notice: Subject to any disclaimer, the term of this patent is extended or adjusted under 35 U.S.C. 154(b) by 402 days.

(21) Appl. No.: 17/500,493

(22) Filed: Oct. 13, 2021

(65) Prior Publication Data

US 2023/0110010 A1  Apr. 13, 2023

(51) Int. Cl.
*B65H 75/36* (2006.01)
*H02G 11/00* (2006.01)

(52) U.S. Cl.
CPC .......... *B65H 75/362* (2013.01); *H02G 11/00* (2013.01); *B65H 2701/34* (2013.01)

(58) Field of Classification Search
CPC .. B65H 75/36; B65H 75/362; B65H 2701/34; H02G 11/00
USPC ........................................................ 174/135
See application file for complete search history.

(56) References Cited

U.S. PATENT DOCUMENTS

| 7,011,422 B2* | 3/2006 | Robertson ............. F21V 33/006 362/311.03 |
| 7,556,165 B2 | 7/2009 | McDade |
| 8,882,055 B2 | 11/2014 | Yang |
| 10,834,838 B1 | 11/2020 | Ross |

FOREIGN PATENT DOCUMENTS

| CN | 20182104097 | 1/2019 |
| GB | 820892 | 9/1959 |
| GB | 2338698 | 12/1999 |
| WO | WO2004080829 | 9/2004 |

* cited by examiner

Primary Examiner — Tremesha S Willis (57) ABSTRACT

A selectively deployable cable management device for organizing cables includes a plurality of panels, the panels of which are selectively stackable into a stowed configuration so that a volume of the plurality of panels is minimized. The panels are selectively interconnectable to form a box. A power distribution device, such as a power strip, can be positioned in an interior space defined by the box. Each of a plurality of apertures is positioned in a front facet or respective opposed end facet of the box. The apertures vent the interior space and are used for extension of a power cable from the power distribution device to a source of electrical current and for insertion of a power cord extending to an electronic device to connect and operationally engage the electronic device to the power distribution device.

17 Claims, 9 Drawing Sheets

SELECTIVELY DEPLOYABLE CABLE MANAGEMENT DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to cable management devices and more particularly pertains to a new cable management device for organizing cables. The present invention discloses a cable management device comprising a plurality of panels, which can be shipped and stored in a compact, stacked configuration. The panels are readily assembled into a box in which apertures are positioned for venting and extension of cables and cords.

(2) Description of Related Art Including Information Disclosed Under 37 CFR 1.97 and 1.98

The prior art relates to cable management devices. Prior art cable management devices generally comprise non-collapsible boxes, which require a greater shipping and storage volumes. What is lacking in the prior art is a cable management device comprising a plurality of panels, which can be shipped and stored in a compact stacked configuration and then readily assembled by an end user into a box to be used in managing cables.

BRIEF SUMMARY OF THE INVENTION

An embodiment of the disclosure meets the needs presented above by generally comprising a plurality of panels, the panels of which are selectively stackable into a stowed configuration so that a volume of the plurality of panels is minimized. The panels are selectively interconnectable to form a box. An interior space defined by the box is configured for positioning of a power distribution device, such as a power strip. Each of a plurality of apertures is positioned in a front facet or respective opposed end facet of the box and is configured to vent the interior space. The aperture also is configured for one or both of extension of a power cable and insertion of a power cord. The power cable extends from the power distribution device to a source of electrical current. The power cord extends to an electronic device and both connects and operationally engages the electronic device to the power distribution device.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 9 thereof, a new cable management device embodying the principles and concepts of an embodiment of the disclosure and generally designated by the reference numeral 10 will be described.

Figure 6:
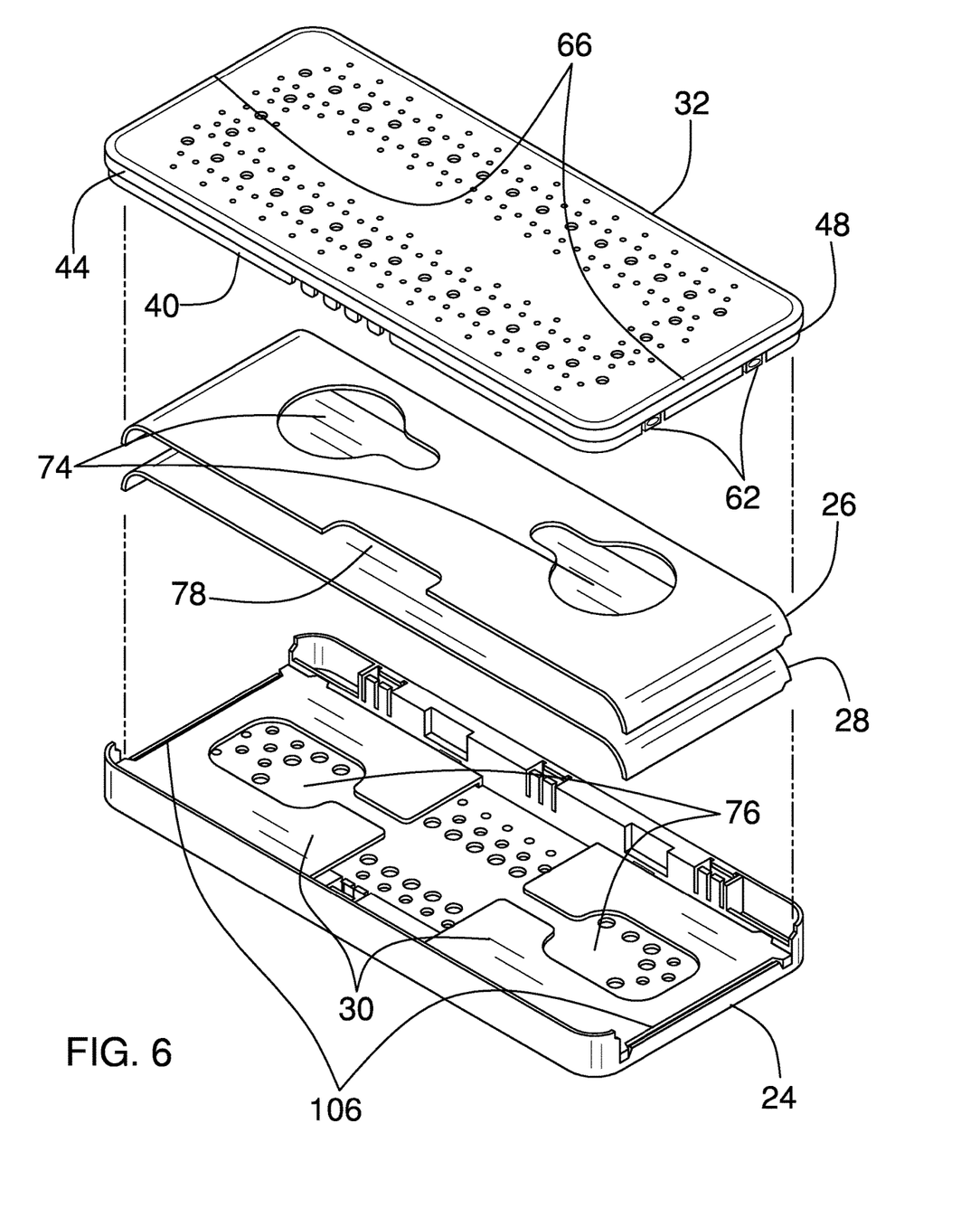
FIG. 6 is an in-use view of an embodiment of the disclosure.
Figure 7:
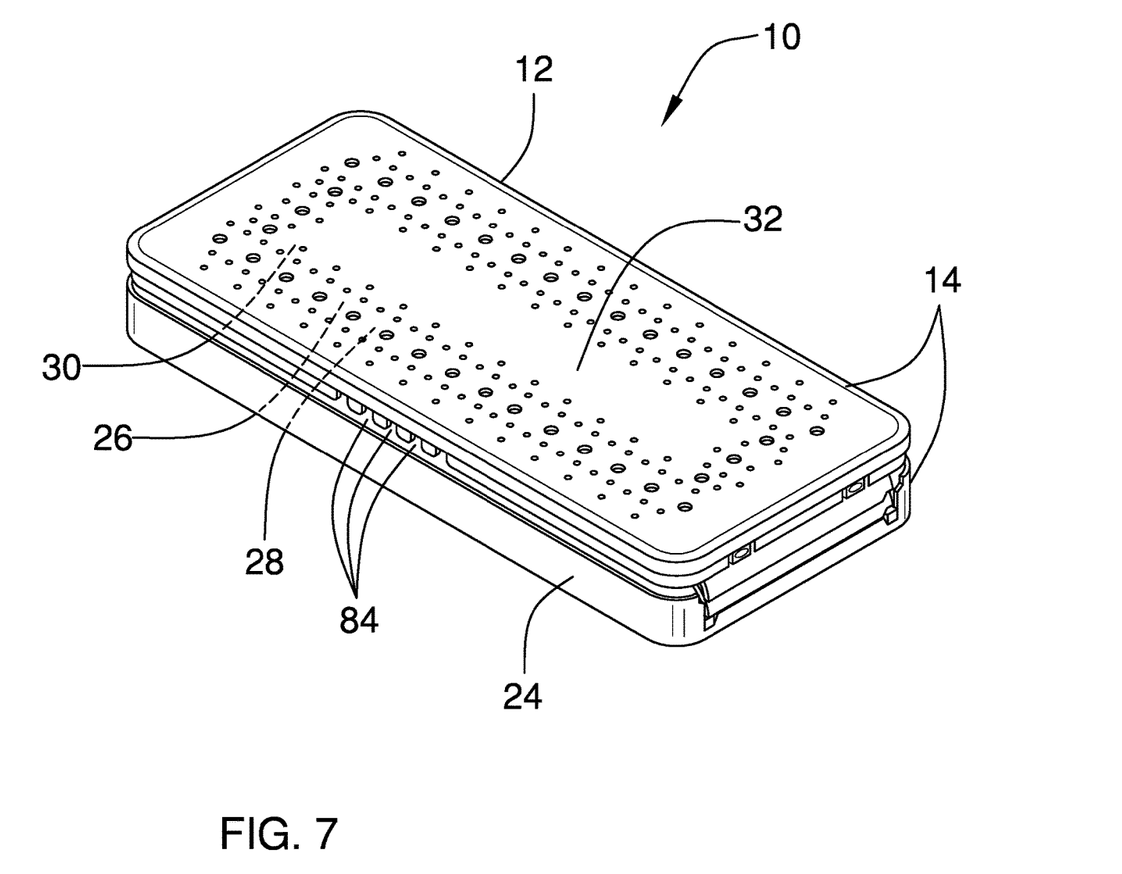
FIG. 7 is an isometric perspective view of an embodiment of the disclosure in a stowed configuration.
Figure 8:
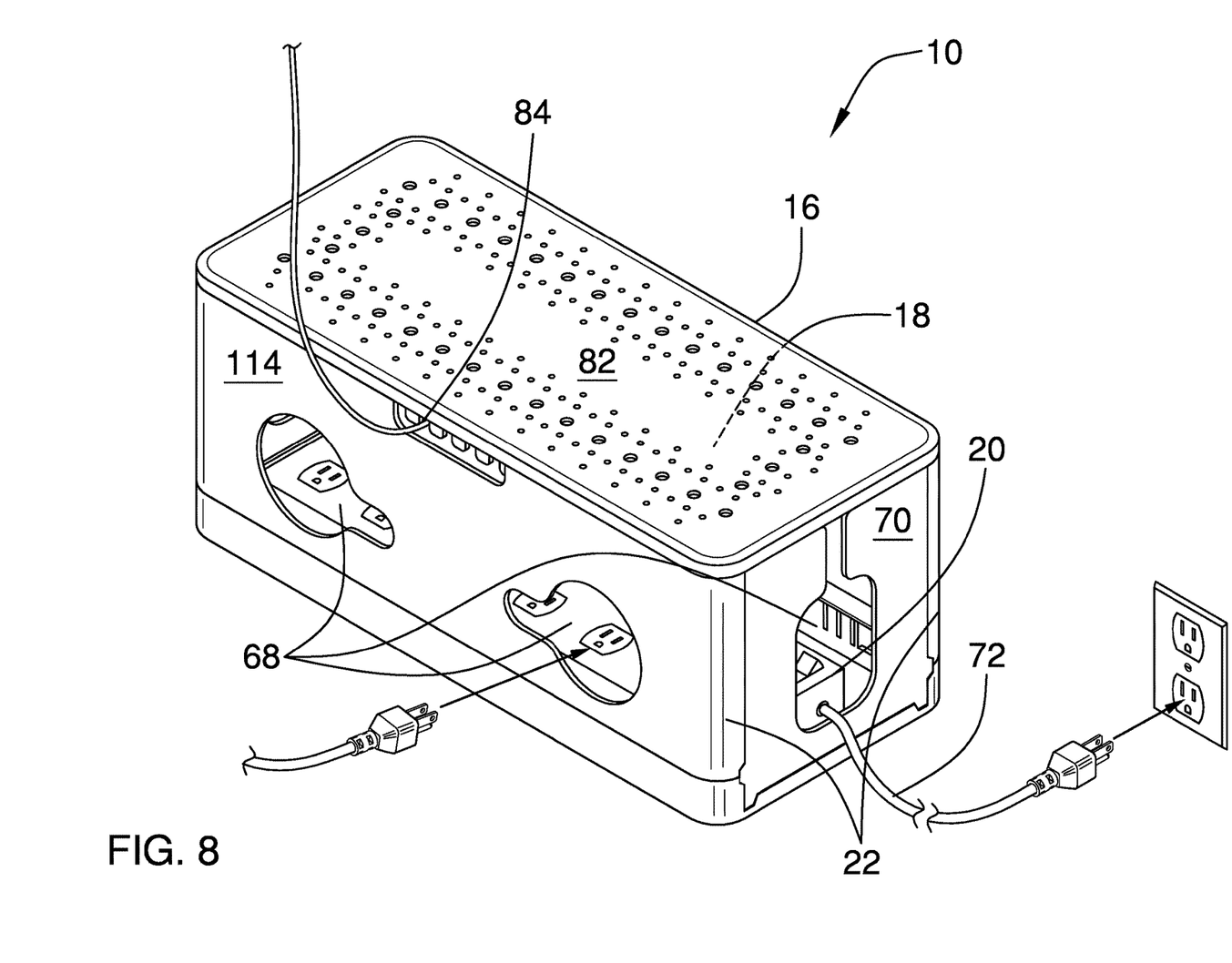
FIG. 8 is an in-use view of an embodiment of the disclosure.
Figure 9:
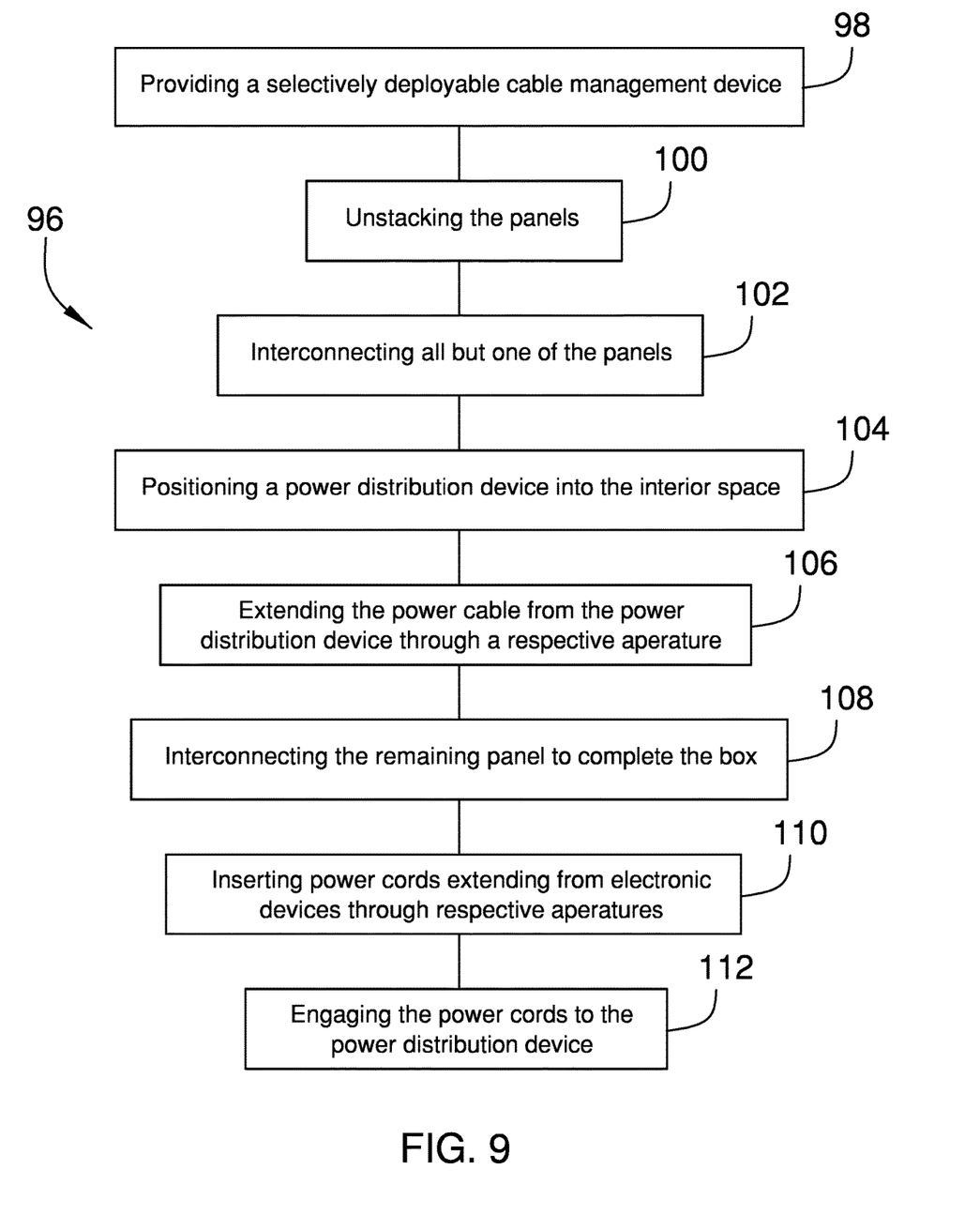
FIG. 9 is a flow diagram for a method utilizing an embodiment of the disclosure.

As best illustrated in FIGS. 1 through 9, the selectively deployable cable management device 10 generally comprises a plurality of panels 12. The panels 12 are selectively stackable into a stowed configuration, as is shown in FIGS. 6 and 7, so that a volume 14 of the plurality of panels 12 is minimized. The panels 12 also are selectively interconnectable to form a box 16. An interior space 18 defined by the box 16 is configured for positioning of a power distribution device 20. Respective panels 12 of the plurality of panels 12 are molded so that vertical edges 22 of the box 16 are arcuate. In the stowed configuration, the deployable cable management devices 10 is optimized for transport, delivery, and for display on store shelves and racks.

The plurality of panels 12 comprises a bottom piece 24, a front piece 26, a back piece 28, opposing end pieces 30, and a top piece 32. The front piece 26 and the back piece 28 are selectively engageable to a forward edge 34 and a rearward edge 36 of the bottom piece 24, respectively, so that the front piece 26 and the back piece 28 extend substantially perpendicularly and codirectionally from the bottom piece 24. Each opposing end piece 30 is hingedly engaged to a respective opposing end 106 of the bottom piece 24. The opposing end piece 30 is folded onto the bottom piece 24 in the stowed configuration and is configured to engage the front piece 26 and the back piece 28 upon hinging of the opposing end piece 30 to a position substantially perpendicular to the bottom piece 24. The top piece 32 is selectively engageable to the opposing end pieces 30 to complete the box 16.

The selectively deployable cable management device 10 also may comprise a pair of ridges 38 engaged to the bottom piece 24, with one ridge 38 extending along the rearward edge 36 and the other ridge 38 extending along the forward edge 34 of the bottom piece 24.

A first lip 40 is engaged to and extends from a lower face 42 of the top piece 32. The first lip 40 extends circumferentially around the top piece 32 to define a second lip 44. The second lip 44 rests upon the opposing end pieces 30, the back piece 28, and the front piece 26 upon insertion of the first lip 40 between the opposing end pieces 30 and between the front piece 26 and the back piece 28.

Each of a plurality of fasteners 46 is engaged to a respective panel 12 proximate to a perimeter 48 of the respective panel 12. The fasteners 46 are selectively mutually couplable so that the plurality of panels 12 is selectively interconnectable to form the box 16.

Figure 4:
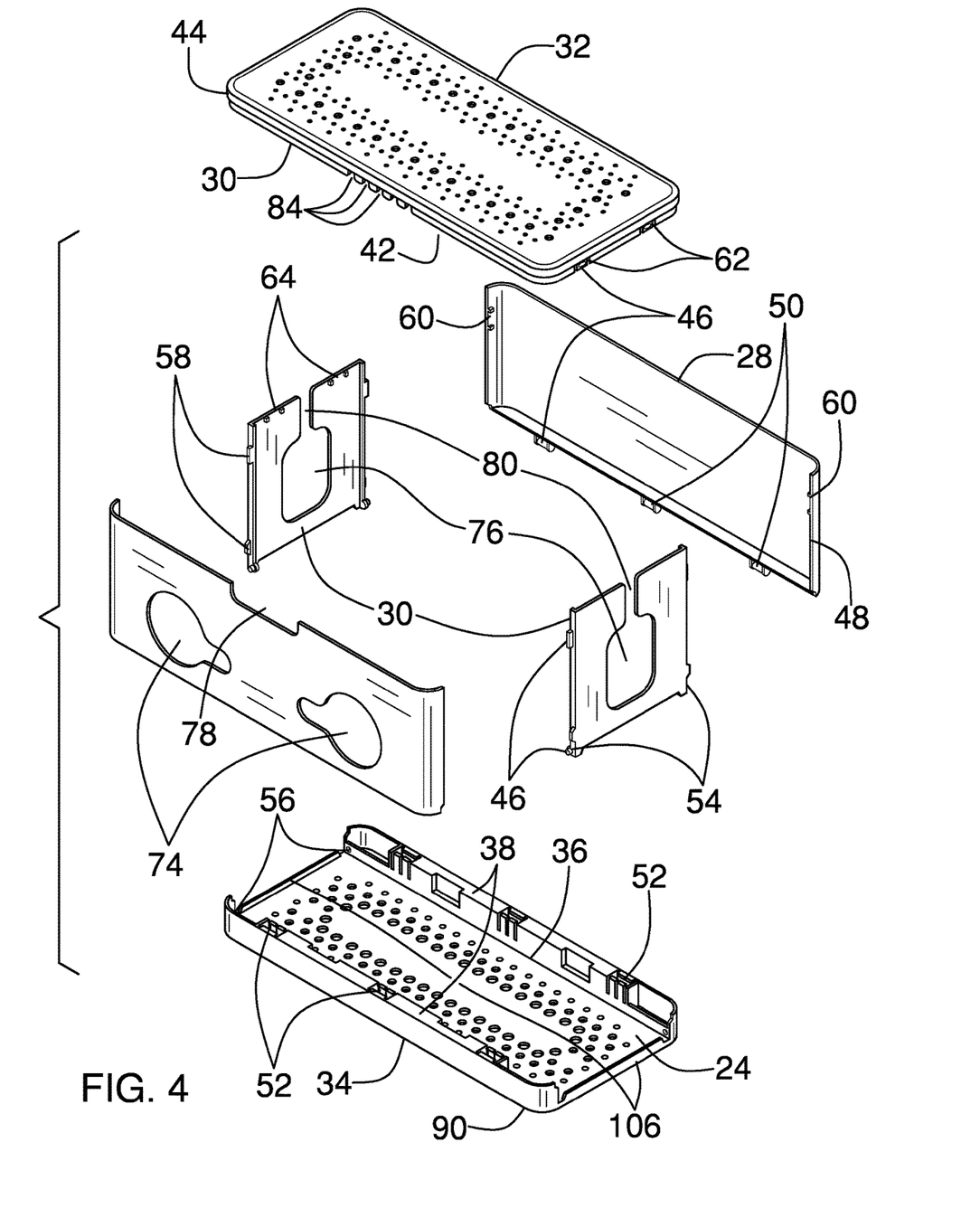
FIG. 4 is an exploded view of an embodiment of the disclosure.
Figure 5:
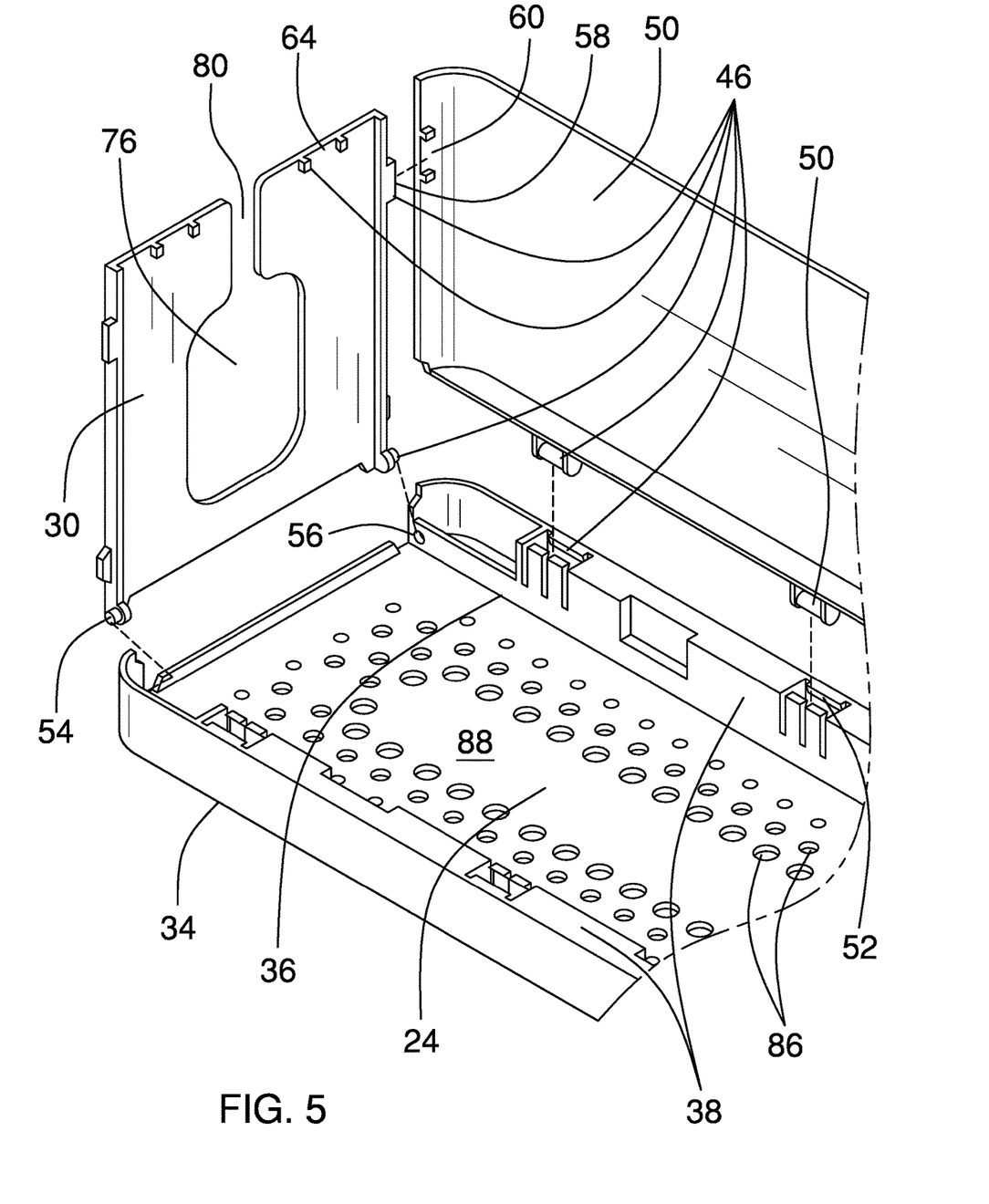
FIG. 5 is a detail view of an embodiment of the disclosure.

The plurality of fasteners 46 comprises a plurality of locking pins 50 and a plurality of pin receivers 52. The locking pins 50 are engaged to the front piece 26 and the back piece 28. The pin receivers 52 are positioned in the pair of ridges 38 so that each pin receiver 52 is positioned for insertion of a respective locking pin 50 to engage the front piece 26 and the back piece 28 to the pair of ridges 38. The plurality of locking pins 50 may comprise six locking pins 50, which are engaged three-apiece to the front piece 26 and the back piece 28, as is shown in FIG. 4. The present invention also anticipates other numbers of locking pins 50, such as, but not limited to, four locking pins 50 engaged two-apiece to the front piece 26 and the back piece 28.

The plurality of fasteners 46 also comprises a set of hinge pins 54 and a set of pin holes 56. The hinge pins 54 are positioned two-apiece on the opposing end pieces 30. The pin holes 56 are positioned two-apiece in each of the ridges 38 so that each pin hole 56 is positioned for insertion of a respective hinge pin 54 to hingedly engage the opposing end pieces 30 to the ridges 38.

The plurality of fasteners 46 also comprises a set of first tabs 58 and a set of first receivers 60. The first tabs 58 are positioned two-apiece on the opposing end pieces 30. The first receivers 60 are positioned two-apiece on each of the front piece 26 and the back piece 28 so that each first receiver 60 is positioned for insertion of a respective first tab 58 as the opposing end pieces 30 are positioned substantially perpendicularly to the bottom piece 24. The opposing end pieces 30 thus are engaged to the front piece 26 and the back piece 28.

The plurality of fasteners 46 also comprises a set of second tabs 62 and a set of second receivers 64. The second tabs 62 are engaged to the first lip 40 and are positioned two-apiece proximate to opposed ends 66 of the top piece 32. The second receivers 64 are positioned two-apiece on the opposing end pieces 30 so that each second receiver 64 is positioned for insertion of a respective second tab 62 as the first lip 40 is inserted between the opposing end pieces 30. The top piece 32 thus is engaged to the opposing end pieces 30.

The present invention also anticipates the plurality of fasteners 46 comprising other fastening means, such as, but not limited to, snap-fittings, hinges, and the like. For example, the top piece 32 may be hingedly engaged to the back piece 28, and the front piece 26 and back piece 28 both may be hingedly engaged to the bottom piece 24, with the plurality of panels 12 still being stackable into the stowed configuration.

Each of a plurality of apertures 68 is positioned in a front facet 114 or respective opposed end facet 70 of the box 16 and is configured to vent the interior space 18. The aperture 68 also is configured for one or both of extension of a power cable 72 and insertion of a power cord of an electronic device (not shown, but examples of which include computers, computer peripherals, battery backup devices, fans, and the like). The power cable 72 extends from the power distribution device 20 to a source of electrical current. The power cord extends to an electronic device and both connects and operationally engages the electronic device to the power distribution device 20. In this regard, the selectively deployable cable management device 10 function substantially similarly to prior art cable management devices which are not selectively deployable.

The plurality of apertures 68 may comprise a set of first cutouts 74, a pair of second cutouts 76, and a third cutout 78. The set of first cutouts 74 is positioned in the front piece 26 and may comprise two first cutouts 74, which may be keyhole slot shaped. Each second cutout 76 is positioned in a respective opposed end facet 70, may be substantially square, and may be substantially centrally positioned in the respective opposed end facet 70. Either of the second cutouts 76 is configured for extension of the power cable 72 from the power distribution device 20 to the source of electrical current. A respective second cutout 76 allows access to the power distribution device 20 to switch it on and off.

Each of a pair of cable slots 80 may extend from a respective second cutout 76 to a top facet 82 of the box 16. The cable slot 80 is configured for insertion of the power cable 72 of the power distribution device 20. The third cutout 78 is positioned in the front piece 26 and is aligned with a plurality of cord slots 84 positioned in the first lip 40. Each cord slot 84 is configured for insertion of a respective power cord of a plurality of power cords for organizing the power cords.

As will be apparent to those skilled in the art of cable management, configurations of apertures 68 having a variety of shapes, numbers, and positioning in the box 16 may be more suitable for specific cable management situations, and these configurations are anticipated by the present invention.

Figure 1:
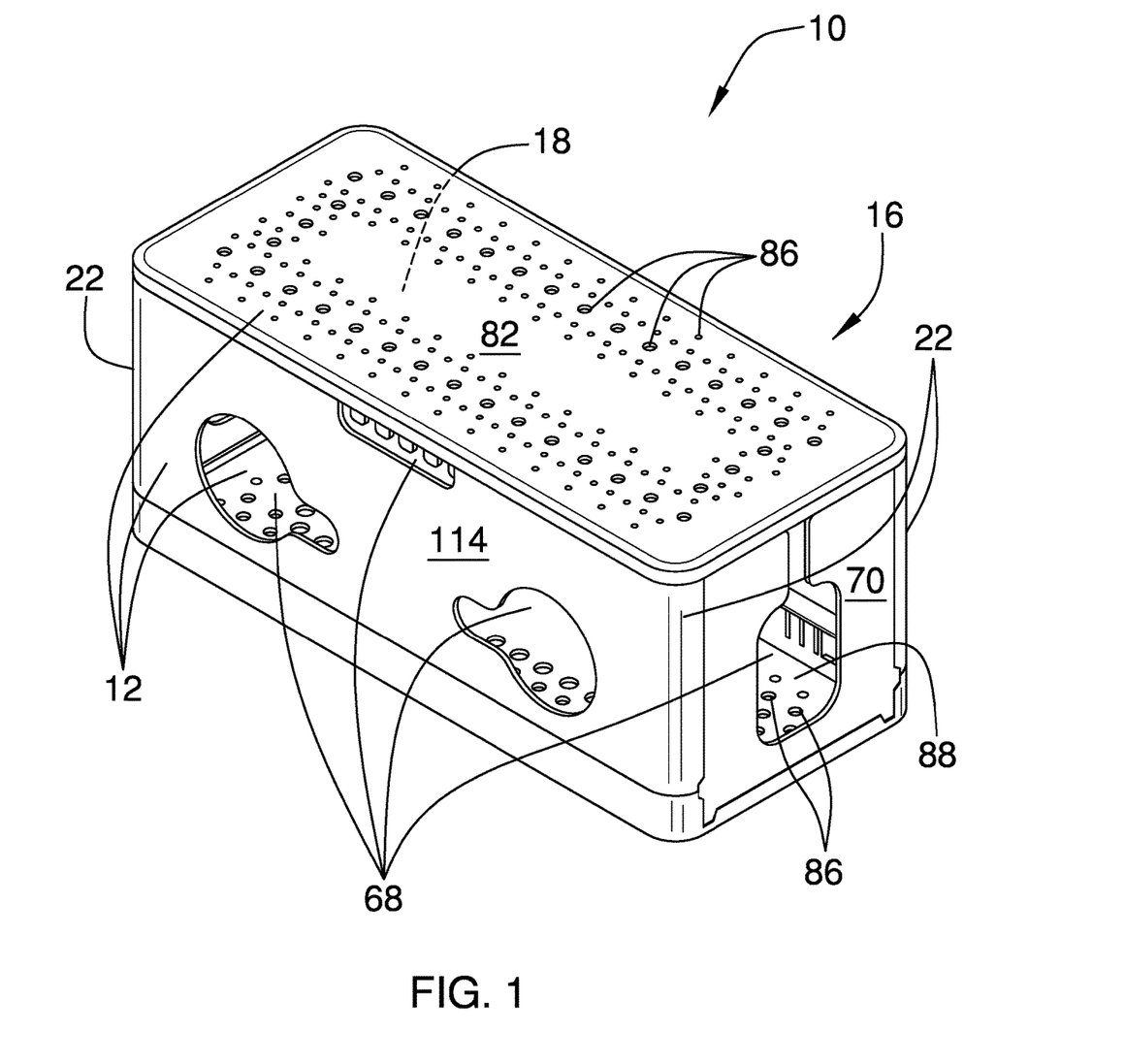
FIG. 1 is a front isometric perspective view of a selectively deployable cable management device according to an embodiment of the disclosure.
Figure 2:
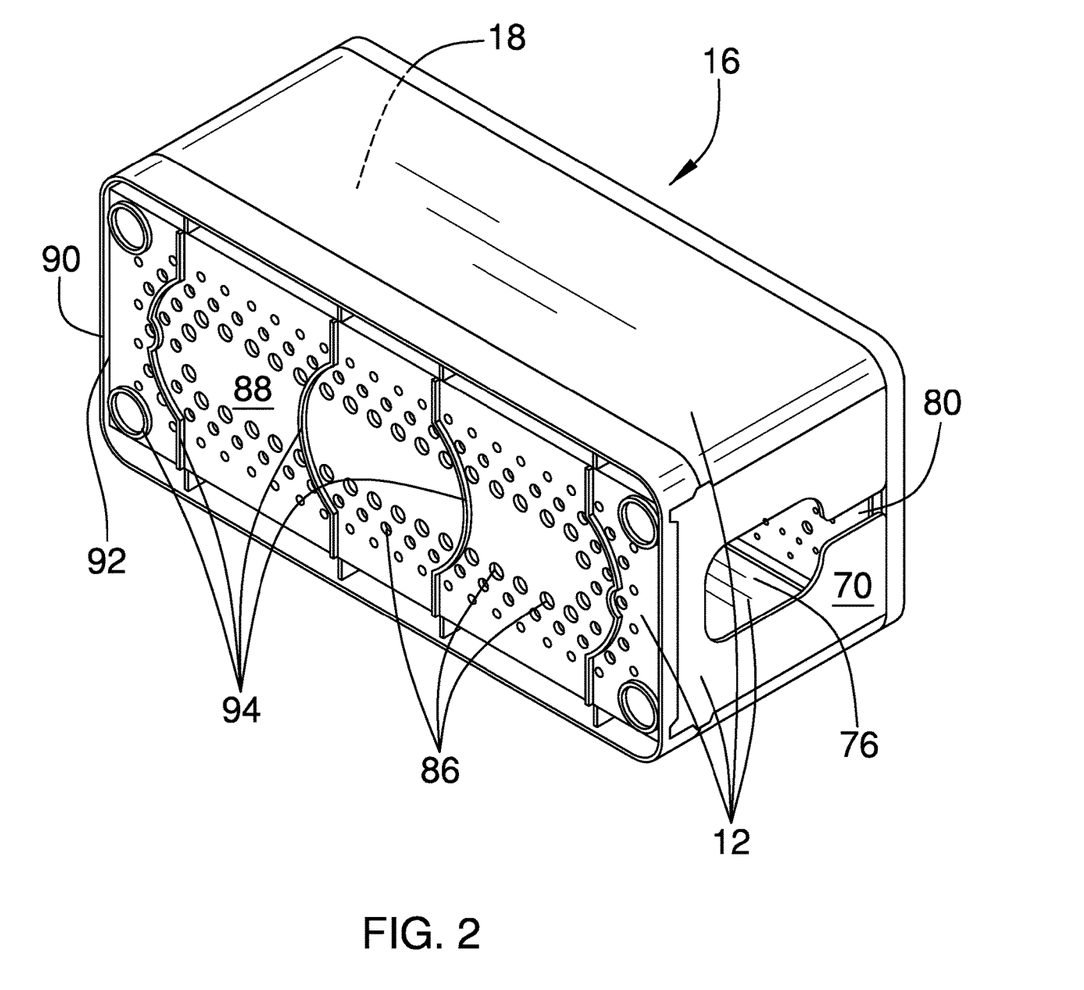
FIG. 2 is a bottom isometric perspective view of an embodiment of the disclosure.

A plurality of vent holes 86 is positioned in the box 16. The vent holes 86 are configured to ventilate the interior space 18. The vent holes 86 may be positioned in the top facet 82 and a bottom facet 88 of the box 16, as is shown in FIGS. 1, 2, and 4. A rim 90 is engaged to and extends from a periphery 92 of the bottom piece 24 so that the bottom piece 24 is elevated from a surface upon which the box 16 is positioned. The rim 90 facilitates ventilation of the interior space 18. A plurality of protrusions 94 is engaged to and extends from the bottom piece 24 codirectionally with the rim 90. The protrusions 94 are configured to stabilize the box 16 on the surface.

Figure 3:
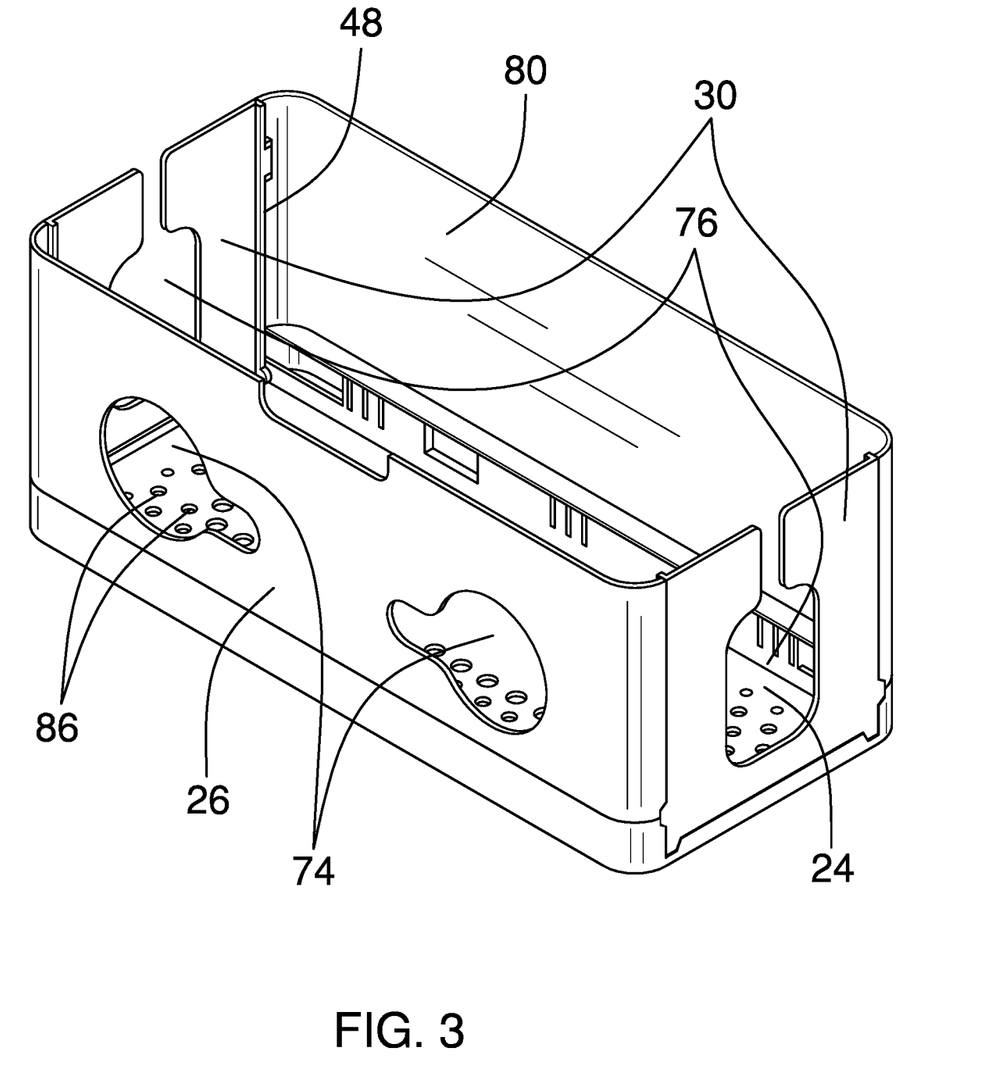
FIG. 3 is a front isometric perspective view of an embodiment of the disclosure.

In use, the selectively deployable cable management device 10 enables a method 96 of managing cables. The method 96 comprises a first step 98 of providing a selectively deployable cable management device 10 according to the specification above. A second step 100 of the method 96 is unstacking the panels 12. A third step 102 of the method 96 is interconnecting all but one of the panels 12 into an open topped box configuration, as is shown in FIG. 3. A fourth step 104 of the method 96 is positioning a power distribution device 20 into the interior space 18. A fifth step 106 of the method 96 is extending the power cable 72 from the power distribution device 20 through a respective aperture 68 to the source of electrical current. A sixth step 108 of the method 96 is interconnecting the remaining panel 12 to complete the box 16. A seventh step 110 of the method 96 is inserting power cords extending from electronic devices through respective apertures 68. An eighth step 112 of the method 96 is engaging the power cords to the power distribution device 20.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A selectively deployable cable management device comprising:
   a plurality of panels, the panels being selectively separable from each other and stackable into a stowed configuration, such that a volume of the plurality of panels is minimized, the panels being selectively interconnectable to form a box, wherein an interior space defined by the box is configured for positioning of a power distribution device;
   a plurality of apertures, each aperture being positioned in a front facet or respective opposed end facet of the box, wherein the aperture is configured for venting the interior space and wherein the aperture is configured for one or both of:
       extension of a power cable from the power distribution device to a source of electrical current, and
       insertion of a power cord of an electronic device for connection to the power distribution device, for operationally engaging the electronic device to the power distribution device.

2. The selectively deployable cable management device of claim 1, wherein respective panels of the plurality of panels are molded such that vertical edges of the box are arcuate.

3. The selectively deployable cable management device of claim 1, wherein the plurality of panels comprises:
   a bottom piece;
   a front piece selectively engageable to a forward edge of the bottom piece, such that the front piece extends substantially perpendicularly from the bottom piece;
   a back piece selectively engageable to a rearward edge of the bottom piece, such that the back piece extends substantially perpendicularly from the bottom piece and codirectionally with the front piece;
   opposing end pieces, each opposing end piece being hingedly engaged to a respective opposing end of the bottom piece, such that the opposing end piece is folded onto the bottom piece in the stowed configuration, the opposing end piece being configured for engaging the front piece and the back piece upon hinging of the opposing end piece to a position substantially perpendicular to the bottom piece; and
   a top piece selectively engageable to the opposing end pieces for completing the box.

4. The selectively deployable cable management device of claim 3, further including:
   a pair of ridges, one ridge being engaged to the bottom piece and extending along the rearward edge, the other ridge being engaged to the bottom piece and extending along the forward edge; and
   a first lip engaged to and extending from a lower face of the top piece, the first lip extending circumferentially around the top piece defining a second lip, such that the second lip rests upon the opposing end pieces, the back piece, and the front, piece upon insertion of the first, lip between the opposing end pieces and between the front piece and the back piece.

5. The selectively deployable cable management device of claim 1, further including a plurality of fasteners, each fastener being engaged to a respective panel proximate to a perimeter of the respective panel, the fasteners being selectively mutually couplable, such that the plurality of panels is selectively interconnectable to form the box.

6. The selectively deployable cable management device of claim 4, further including a plurality of fasteners, each fastener being engaged to a respective panel proximate to a perimeter of the respective panel, the fasteners being selectively mutually couplable, such that the plurality of panels is selectively interconnectable to form the box, the plurality of fasteners comprising:
   a plurality of locking pins engaged to the front piece and the back piece;
   a plurality of pin receivers positioned in the pair of ridges, such that each pin receiver is positioned for insertion of a respective locking pin for engaging the front piece and the back piece to the pair of ridges;
   a set of hinge pins positioned two-apiece on the opposing end pieces;
   a set of pin holes positioned two-apiece in the ridges, such that each pin hole is positioned for insertion of a respective hinge pin for hingedly engaging the opposing end pieces to the ridges;
   a set of first tabs positioned two-apiece on the opposing end pieces;
   a set of first receivers positioned two-apiece on each of the front piece and the back piece, such that each first receiver is positioned for insertion of a respective first tab as the opposing end pieces are positioned substantially perpendicularly to the bottom piece, such that the opposing end pieces are engaged to the front piece and the back piece;

a set of second tabs engaged to the first lip and being positioned two-apiece proximate to opposed ends of the top piece; and a set of second receivers positioned two-apiece on the opposing end pieces, such that each second receiver is positioned for insertion of a respective second tab as the first lip is inserted between the opposing end pieces, such that the top piece is engaged to the opposing end pieces.

7. The selectively deployable cable management device of claim 6, wherein the plurality of locking pins comprises six locking pins engaged three-apiece to the front piece and the back piece.

8. The selectively deployable cable management device of claim 1, further including a plurality of vent holes positioned in the box, wherein the vent holes are configured for ventilating the interior space.

9. The selectively deployable cable management device of claim 8, wherein the vent holes are positioned in a top facet and a bottom facet of the box.

10. The selectively deployable cable management device of claim 9, further including:

a rim engaged to and extending from a periphery of the bottom piece, such that the bottom piece is elevated from a surface upon which the box is positioned, such that ventilation of the interior space is facilitated; and a plurality of protrusions engaged to and extending from the bottom piece codirectionally with the rim, wherein the protrusions are configured for stabilizing the box on the surface.

11. The selectively deployable cable management device claim 3, wherein the plurality of apertures comprises:

a set of first cutouts positioned in the front piece; and a pair of second cutouts, each second cutout being positioned in a respective opposed end facet, wherein either of the second cutouts is configured for extension of the power cable from the power distribution device to the source of electrical current.

12. The selectively deployable cable management device of claim 11, wherein the set of first, cutouts comprising two first cutouts.

13. The selectively deployable cable management device of claim 11, wherein:

the first cutouts are keyhole slot shaped; and the second cutout is substantially square and substantially centrally positioned the respective opposed end facet.

14. The selectively deployable cable management device of claim 11, further including:

a first lip engaged to and extending from a lower face of the top piece and extending circumferentially around the top piece a defining a second lip, such that the second lip rests upon the opposing end pieces, the back piece, and the front piece upon insertion of the first lip between the opposing end pieces and between the front piece and the back piece; and a third cutout positioned in the front piece and being aligned with a plurality of cord slots positioned in the first lip, wherein each cord slot is configured for insertion of a respective power cord of a plurality of power cords for organizing the power cords.

15. The selectively deployable cable management device of claim 11, further including a pair of cable slots, each cable slot extending from a respective second cutout to a top facet of the box, wherein the cable slot is configured for insertion of the power cable of the power distribution device.

16. A selectively deployable cable management system comprising:

a plurality of panels, the panels being selectively separable from each other and stackable into a stowed configuration, such that a volume of the plurality of panels is minimized, the panels being selectively interconnectable to form a box;

a plurality of apertures, each aperture being positioned in a front facet or respective opposed end facet of the box, such that the aperture is positioned for venting the interior space;

a power distribution device positioned in an interior space defined by the box, the power distribution device being configured for operationally engaging power cords extending from a plurality of electrical devices through the apertures into the interior space; and a power cable engaged to and extending from the power distribution device through a respective aperture, the power cable being configured for operationally engaging the power distribution device to a source of electrical current, wherein the power distribution device is configured for distributing power from the source of electrical current to the plurality of electrical devices.

17. A method of managing cables, the method comprising the steps of:

providing a selectively deployable cable management device comprising:

a plurality of panels, the panels being selectively separable from each other and stackable into a stowed configuration, such that a volume of the plurality of panels is minimized, the panels being selectively interconnectable to form a box, wherein an interior space defined by the box is configured for positioning of a power distribution device, a plurality of apertures, each aperture being positioned in a front facet or respective opposed end facet of the box, wherein the aperture is configured for venting the interior space and configured for one or both of:

extension of a power cable from the power distribution device to a source of electrical current, and insertion of a power cord for connection to the power distribution device for operationally engaging an electronic device to the power distribution device;

unstacking the panels;

interconnecting all but one of the panels into an open topped box configuration;

positioning a power distribution device into the interior space;

extending the power cable from the power distribution device through a respective aperture to the source of electrical current;

interconnecting the remaining panel to complete the box;

inserting power cords extending from electronic devices through respective apertures; and engaging the power cords to the iso per distribution device.

* * * * *